(12) United States Patent
Soma' et al.

(10) Patent No.: US 8,978,800 B2
(45) Date of Patent: Mar. 17, 2015

(54) ELECTROHYDRAULIC HYBRID LIFTING VEHICLE

(75) Inventors: Aurelio Soma', Cervasca (IT); Nicola Bosso, Cervasca (IT); Amilcare Merlo, Cervasca (IT)

(73) Assignee: Movimatica SRL, Cervasca (IT)

( * ) Notice: Subject to any disclaimer, the term of this patent is extended or adjusted under 35 U.S.C. 154(b) by 27 days.

(21) Appl. No.: 13/640,461

(22) PCT Filed: Apr. 18, 2011

(86) PCT No.: PCT/IB2011/000848
§ 371 (c)(1),
(2), (4) Date: Feb. 21, 2013

(87) PCT Pub. No.: WO2011/128772
PCT Pub. Date: Oct. 20, 2011

(65) Prior Publication Data
US 2013/0230376 A1    Sep. 5, 2013

(30) Foreign Application Priority Data

Apr. 16, 2010 (IT) .............................. TO2010A0310

(51) Int. Cl.
*B60K 6/42* (2007.10)
*B60K 6/20* (2007.10)
(Continued)

(52) U.S. Cl.
CPC ................. *B66F 9/0655* (2013.01); *B60K 1/04* (2013.01); *B60K 6/46* (2013.01); *B60L 1/003* (2013.01);
(Continued)

(58) Field of Classification Search
USPC ............. 180/292, 68.5, 65.265, 65.25, 65.21, 180/65.22, 305, 306, 307; 477/3, 5, 156, 477/158; 475/101, 108, 136, 137; 182/2.11; 307/9.1
See application file for complete search history.

(56) References Cited

U.S. PATENT DOCUMENTS 4,558,758 A * 12/1985 Littman et al. ................. 180/8.1
5,687,809 A * 11/1997 Braud ........................... 180/297
(Continued)

FOREIGN PATENT DOCUMENTS

| EP | 0879724 | 11/1998 |
| EP | 1967486 | 9/2008 |

(Continued)

OTHER PUBLICATIONS

International Search Report and Written Opinion mailed Aug. 8, 2011 in PCT/IB2011/000848.

*Primary Examiner* — J. Allen Shriver, II
*Assistant Examiner* — James M Dolak
(74) *Attorney, Agent, or Firm* — Davidson Berquist Jackson & Gowdey LLP

(57) ABSTRACT

A lifting vehicle having two axles with respective differentials; a constant-velocity, universal joint drive connecting the differentials; a telescopic arm; and a hydraulic circuit powered by a hydraulic pump to operate the telescopic arm. The vehicle also has, housed in a first side compartment between the axles, an internal combustion engine, a reversible electric machine, the hydraulic pump, and a disconnectable drive for selectively disconnecting the internal combustion engine from the reversible electric machine and hydraulic pump; the reversible electric machine driving the hydraulic pump when the internal combustion engine is disconnected from the disconnectable drive; and a battery being housed in a second side compartment, on the opposite side of the constant-velocity, universal joint drive to the first side compartment, being connected for charging to the reversible electric machine, and being connected to an electric motor connected to the battery and the constant-velocity, universal joint drive in a third compartment beneath the telescopic arm.

15 Claims, 3 Drawing Sheets

(51) Int. Cl.
*B60R 16/04* (2006.01)
*B66F 9/065* (2006.01)
*B60K 1/04* (2006.01)
*B60K 6/46* (2007.10)
*B60L 1/00* (2006.01)
*B60L 3/00* (2006.01)
*B60L 11/00* (2006.01)
*B60L 11/14* (2006.01)
*B60L 11/18* (2006.01)
*B66F 9/075* (2006.01)
*E02F 9/02* (2006.01)
*E02F 9/20* (2006.01)
*E02F 9/22* (2006.01)
*B66F 9/22* (2006.01)

(52) U.S. Cl.
CPC ............. *B60L 3/0061* (2013.01); *B60L 11/005* (2013.01); *B60L 11/14* (2013.01); *B60L 11/1877* (2013.01); *B66F 9/07595* (2013.01); *E02F 9/02* (2013.01); *E02F 9/2025* (2013.01); *E02F 9/2075* (2013.01); *E02F 9/2246* (2013.01); *B66F 9/22* (2013.01); *B60L 2200/42* (2013.01); *B60L 2210/40* (2013.01); *B60L 2240/36* (2013.01); *B60L 2240/421* (2013.01); *B60L 2240/441* (2013.01); *B60Y 2200/15* (2013.01); *Y02T 10/6217* (2013.01); *Y02T 10/642* (2013.01); *Y02T 10/7005* (2013.01); *Y02T 10/7011* (2013.01); *Y02T 10/7022* (2013.01); *Y02T 10/705* (2013.01); *Y02T 10/7077* (2013.01); *Y02T 10/7241* (2013.01); *Y10S 903/903* (2013.01)
USPC ................... 180/65.22; 180/65.21; 180/68.5; 903/903

(56) References Cited

U.S. PATENT DOCUMENTS

| | | | | |
|---|---|---|---|---|
| 5,707,202 | A | | 1/1998 | Brown |
| 5,944,130 | A | * | 8/1999 | Sewell .................. 180/14.4 |
| 6,065,565 | A | * | 5/2000 | Puszkiewicz et al. ......... 182/2.9 |
| 6,656,083 | B2 | * | 12/2003 | Esaki ..................... 477/5 |
| 6,668,964 | B2 | * | 12/2003 | Braud ..................... 180/292 |
| 6,688,481 | B1 | * | 2/2004 | Adner et al. ................ 212/195 |
| 6,902,026 | B2 | * | 6/2005 | Kinoshita et al. ............. 180/291 |
| 6,904,994 | B2 | * | 6/2005 | Coutant et al. ............... 180/291 |
| 7,673,713 | B2 | * | 3/2010 | Betz et al. ................. 180/65.21 |
| 7,677,340 | B2 | * | 3/2010 | Ichijo et al. ............... 180/65.235 |
| 7,931,103 | B2 | * | 4/2011 | Morrow et al. .............. 180/65.6 |
| 7,950,481 | B2 | * | 5/2011 | Betz et al. ................. 180/65.31 |
| 8,875,819 | B2 | * | 11/2014 | Muggeo et al. ............. 180/65.25 |
| 2009/0166106 | A1 | * | 7/2009 | Batdorf ..................... 180/24.06 |

FOREIGN PATENT DOCUMENTS

| | | |
|---|---|---|
| JP | 2003286000 | 10/2003 |
| JP | 2005133319 | 5/2005 |
| WO | WO 2011/128772 | 10/2011 |

\* cited by examiner

ELECTROHYDRAULIC HYBRID LIFTING VEHICLE

TECHNICAL FIELD

The present invention relates to a hybrid industrial vehicle, such as a telescopic-arm lifting vehicle.

BACKGROUND ART

Telescopic-arm lifting vehicles are low on vehicle drive energy efficiency, and have a fairly high noise level; whereas future directives will inevitably call for greater attention to low-consumption performance and low noise levels.

U.S. Pat. No. 5,707,202 illustrates a telescopic-arm vehicle comprising a hydraulic pump; an actuator powered by the hydraulic pump to operate the telescopic arm; and an internal combustion engine housed in a side compartment between the two vehicle axles. More specifically, the compartment houses a number of parts, a compressor, a filter, and a hydraulic valve assembly; and the vehicle is normally driven by a hydraulic (hydrostatic) motor controlled by the internal combustion engine at various speeds.

In vehicles of this sort, the internal combustion engine must be run continuously; and, to drive the vehicle, this transfers energy from the internal combustion engine to the hydraulic motor. Vehicles of this sort are normally four-wheel-drives; and, when the hydraulic lifting system is running, energy is transferred from the internal combustion engine to the pump by a mechanical drive, which means the internal combustion engine is run continuously, both to move the vehicle back and forth, and to operate the arm.

Typical drawbacks of vehicles of this sort are the poor energy efficiency of the system as a whole, and the difficulty in running the internal combustion engine at the most energy-efficient speed, on account of its speed normally being controlled by the accelerator pedal.

Moreover, the vehicle produces contaminating emissions in all operating conditions, and has a high noise level at high engine speed.

A hybrid vehicle operating system is described in JP-A-2005133319, in which the internal combustion engine and electric motor are located at the rear, together with the batteries. This configuration is particularly bulky, raises the centre of gravity, and is ill-suited to the stability required of telescopic-arm vehicles, in which the centre of gravity must be kept as low as possible to safeguard against the vehicle tipping over. Moreover, no mention is made of the problems posed in assembling individual components to minimize impact on the layout of telescopic-arm vehicles.

The hybrid operating system described provides for running the internal combustion engine connected to a generator, which powers a battery pack in turn powering an electric vehicle-drive motor.

More specifically, the internal combustion engine and the electric motor are user-controlled directly by a first pedal to control both the internal combustion engine and the electric motor, and by a second pedal to control the electric motor only. This means the user can also control the speed of the internal combustion engine on the basis of the load demanded of the electric motor, at the expense of the energy efficiency of the vehicle as a whole.

Moreover, the vehicle described is an excavator, which, unlike a telescopic-arm vehicle, needs more or at least the same power to operate the shovel as to drive the vehicle.

This seriously affects the size of hybrid excavator battery packs. That is, to run 1 hour with the electric vehicle-drive motor and the shovel powered fully electrically, i.e. with the internal combustion engine off, an excavator as described in JP-A-2005133319 would need battery packs of a few hundred kWh, which would be too bulky and heavy for the excavator.

The excavator described therefore cannot be run fully electrically to simultaneously drive the vehicle and operate the shovel. On the contrary, the internal combustion engine must be run continuously to simultaneously drive the vehicle and run the hydraulic system, which can only be powered electrically when the vehicle is stationary.

The system described in JP-A-2005133319 therefore mainly provides for energy saving by turning the internal combustion engine off when the vehicle is stationary; using battery power and the reversible electric machine to run the hydraulic systems for a short period, with no emissions while the vehicle is stationary, until the batteries run down below a given threshold; and then restarting the internal combustion engine. Nowhere is any mention made of designing the battery pack and distributing power between vehicle drive and the hydraulic systems, to balance and control power demand in different vehicle operating conditions.

DISCLOSURE OF INVENTION

It is an object of the present invention to provide an improved configuration by which to easily and cheaply convert an industrial telescopic-arm lifting vehicle, comprising a reversible electric machine and electric vehicle-drive motor, to a hybrid vehicle, while at the same time maintaining the stability demanded of industrial lifting vehicles.

Another object of the present invention is to improve vehicle drive and lifting performance, and enable fully electric operation of the vehicle, e.g. in confined spaces, with zero emissions.

The aims of the present invention are at least partly achieved by a lifting vehicle as claimed in claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
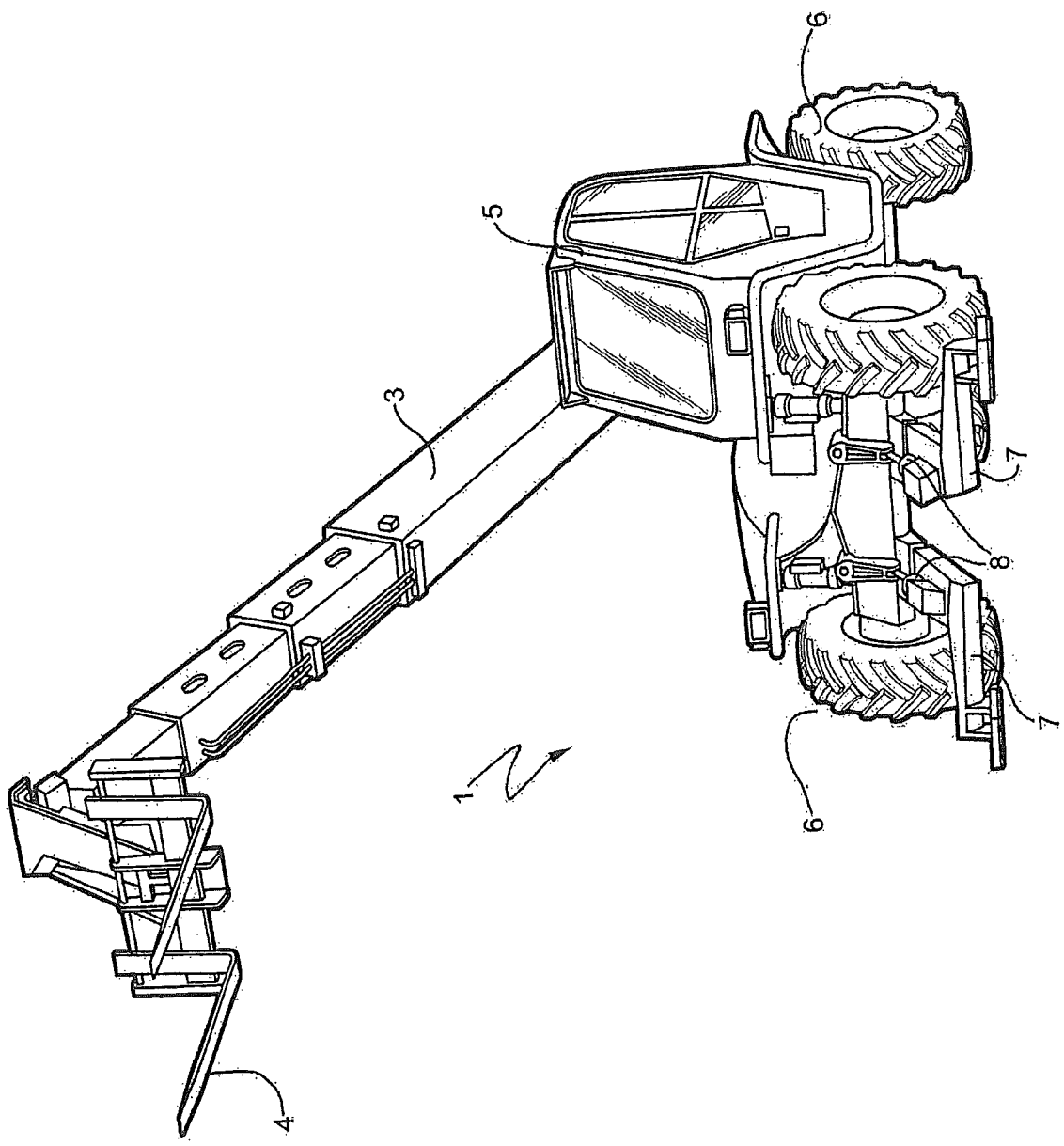
FIG. 1 shows a view in perspective of an example lifting vehicle in accordance with the present invention.

Number 1 In FIG. 1 indicates as a whole a lifting vehicle comprising a frame; a preferably telescopic arm 3 hinged to the frame; a fork-lift tool 4 attached to a free end portion of arm 3; a driver's cab 5; wheels 6 fitted to two axles; and front and rear stabilizers 7 (only the front stabilizers shown in FIG. 1). More specifically, the front and rear stabilizers 7 are operated by respective hydraulic cylinders 8, and are movable between an up position, in which wheels 6 rest on the ground enabling vehicle 1 to move, and a down position, in which stabilizers 7 are lowered by hydraulic cylinders 8 and rest on the ground on plates 9.

Hydraulic cylinders 8 are designed to also raise vehicle 1 in maximum load conditions, and therefore at the discretion of the operator in cab 5, to lift wheels 6 off the ground, so arm 3 can be operated with wheels 6 resting on the ground and stabilizers 7 in the up position, or with stabilizers 7 in the down position and wheels 6 raised off the ground.

Arm 3 has a lift angle with respect to a plane through the axles of wheels 6, and is extendable to different lengths. And arm 3 and cab 5 may optionally be mounted on a platform revolving about an axis perpendicular to the plane containing the axles of wheels 6.

Figure 2:
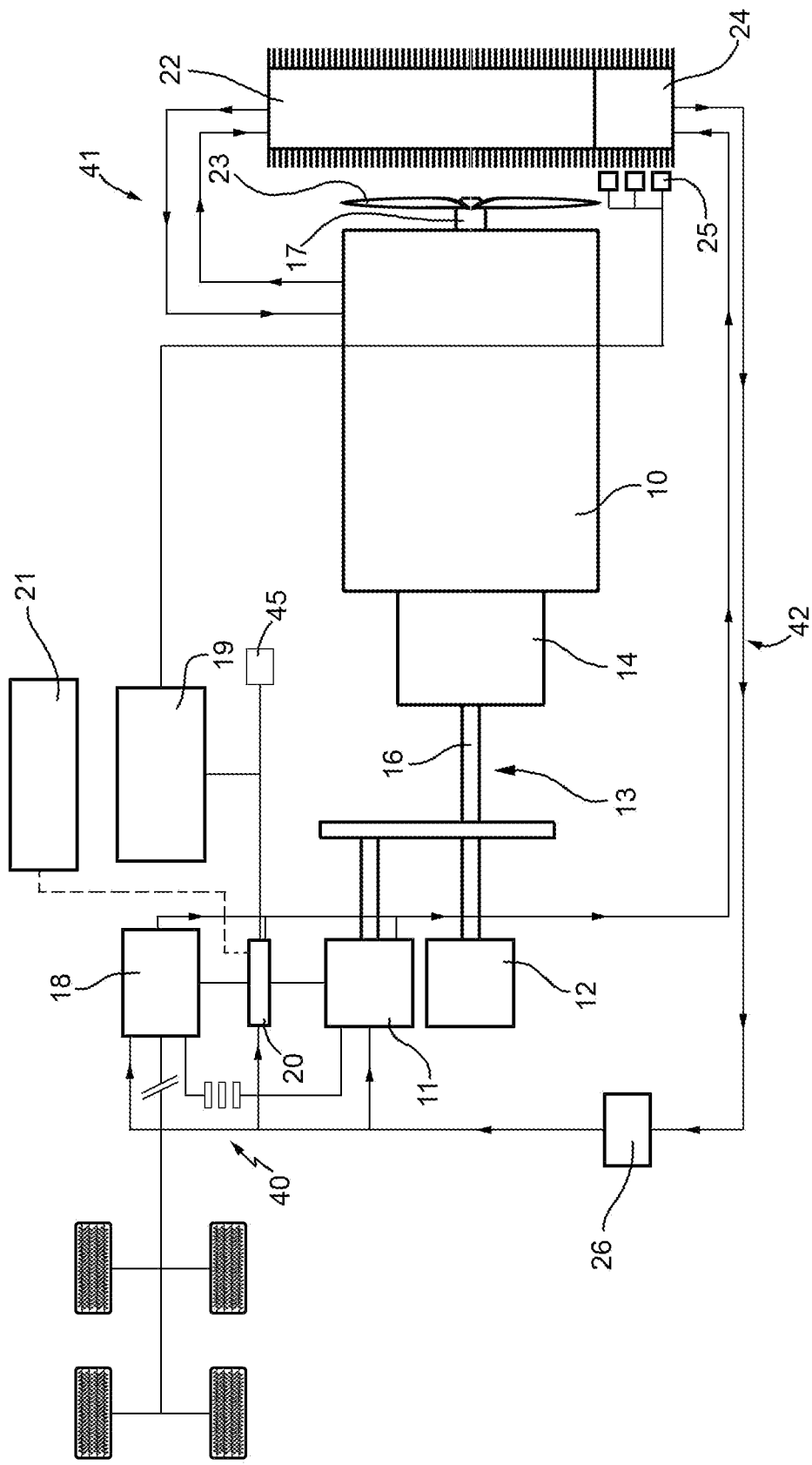
FIG. 2 shows a diagram of the FIG. 1 vehicle-drive system.
Figure 3:
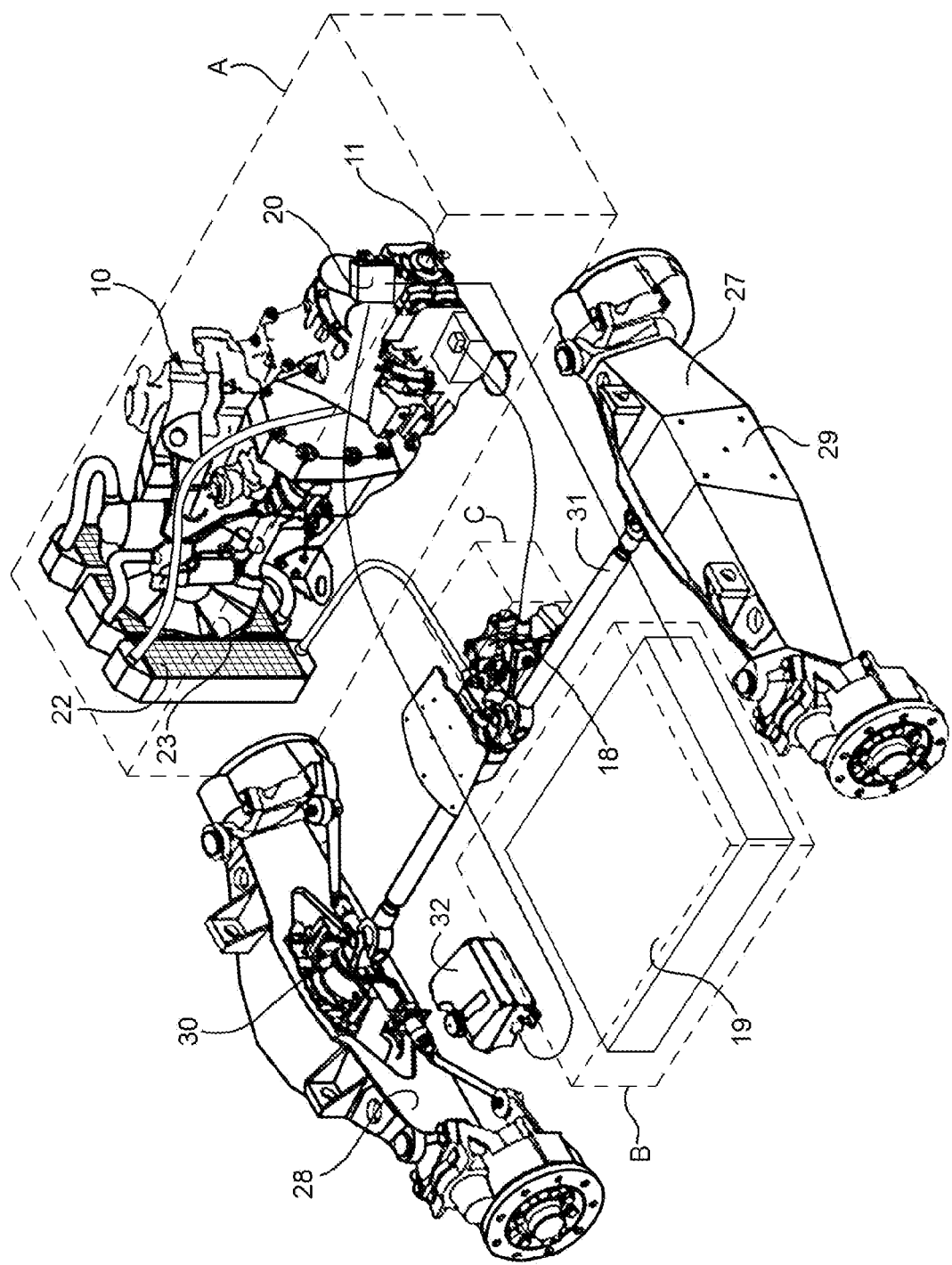
FIG. 3 shows a view in perspective of the FIG. 2 vehicle-drive system.

Vehicle 1 (FIG. 2) advantageously comprises an internal combustion engine 10; a reversible electric machine 11; a hydraulic pump 12; and a disconnectable drive 13 for connecting engine 10 to reversible electric machine 11 and hydraulic pump 12.

More specifically, disconnectable drive 13 comprises a clutch 14, which may be power-operated by the vehicle's hydraulic system, or operated by an electric actuator to permit fully electric operation, even at startup; and a reducer 15 having a main shaft 16 connected by clutch 14 to the crankshaft 17 of engine 10, and a secondary shaft connected to hydraulic pump 12.

Hydraulic pump 12 is connected to all the hydraulic actuators of vehicle 1, e.g. hydraulic cylinders 8, the hydraulic cylinder for tilting arm 3, and the actuator controlling extension of arm 3; to the motor powering rotation of the platform supporting cab 5 and arm 3; and to the controls controlling the transmission, brake solenoid valves, and tool actuating cylinders.

Vehicle 1 also comprises an electric motor 18 connected by disconnectable drive 13 to wheels 6; a battery pack 19 connected to reversible electric machine 11; and a power drive 20 for connecting battery pack 19, reversible electric machine 11, and electric motor 18. A central control unit 21 is connected to power drive 20 to control electric power flow at least between the above three components, and to control the various operating stages of the vehicle and relative control sensors.

Following recent technological improvements in permanent-magnet electric motors, electric machines are now available, designed to meet the size, power, torque, angular speed, and performance requirements of different vehicle ranges, with greater energy efficiency as compared with conventional vehicles.

A cooling system of vehicle 1 comprises a mechanically operated portion; a portion operated electrically by power drive 20; a hydraulic circuit and relative radiator for cooling internal combustion engine 10; and a hydraulic circuit for cooling the electric power components, i.e. reversible electric machine 11, electric motor 18, and power drive 20. More specifically, the internal combustion engine hydraulic cooling circuit comprises a radiator 22 cooled by a fan 23 connected mechanically, e.g. directly, to crankshaft 17, on the opposite side to clutch 14; and the electric power component hydraulic cooling circuit has its own radiator 24, and a number of electric fans 25. Preferably, the two cooling circuits are separate, and electric fans 25 and radiator 24 are designed to remove the heat produced in design conditions by reversible electric machine 11, electric motor 18 and power drive 20. Radiators 22 and 24 are advantageously positioned adjacent to and facing fan 23, which is designed to cool the coolant of both the engine 10 and electric power component cooling circuits. In the embodiment shown of the present invention, electric fans 25 are interposed between radiator 24 and fan 23 for greater compactness.

The electric power component cooling circuit comprises an electric pump 26 connected to the power drive 20, controlled by central control unit 21, and powered by battery pack 19. Vehicle 1 may comprise a higher voltage bus for powering electric motor 18 and reversible electric machine 11 with preferably the same voltage as the batteries; and a low-voltage 12/24V converter to power, in addition to electric pump 26, the entire electric network of the hydraulic circuit control sensors and solenoid valves.

Vehicle 1 also comprises a number of capacitors connected at least to electric motor 18 and/or reversible electric machine 11 to guarantee the necessary power in the event of peak power demand by the driven devices, and to regulate power demand from the batteries.

In a preferred embodiment of the present invention, at least engine 10, fan 23, electric fans 25, radiators 22 and 24, disconnectable drive 13, reversible electric machine 11, and hydraulic pump 12 are housed in one side compartment on vehicle 1, between a front and rear wheel 6.

The frame comprises a front axle 27 and a rear axle 28 with respective differentials 29, 30; and a constant-velocity, double universal joint drive 31 connecting differentials 29 and 30. Electric motor 18 is preferably connected to constant-velocity, double universal joint drive 31 by an at least two-ratio transmission, preferably in a compartment between arm 3 and constant-velocity, double universal joint drive 31. Battery pack 19 is fitted to the frame in another side compartment between front and rear axles 27, 28, i.e. on the opposite side of constant-velocity, double universal joint drive 31 to engine 10. And each axle comprises a reducer in each wheel hub (not shown) for reducing speed from differential 29, 30 to the relative pair of wheels 6.

Vehicle 1 operates as follows.

Engine 10 is connected to electric motor 18 to form a series hybrid drive, i.e. the vehicle is driven solely by electric motor 18, and engine 10 drives hydraulic pump 12 and/or charges the batteries by means of reversible electric machine 11, and drives fan 23 when it is run. Vehicle speed is therefore controlled electrically, and the accelerator pedal 32 is connected to a potentiometer, which sends a relative signal to central control unit 21. This is programmed to automatically turn engine 10 on/off on the basis of a number of operating parameters comprising, for example: the charge of battery pack 19; and/or the torque and/or power demand of pump 12; and/or the power demand of fans 25, 23; and/or the power demanded of electric motor 18. Accelerator pedal 32 controls electric motor 18 directly to control vehicle speed from zero to maximum. By operating a lever to reverse rotation of the electric motor, vehicle 1 can be reversed smoothly, with no need for a clutch or mechanical transmission, and forward/reverse vehicle speed can be controlled by accelerator pedal 32 with no change in the speed of internal combustion engine 10.

Accelerator pedal 32 controls the speed of vehicle 1 directly and continuously in the various vehicle operating conditions; whereas internal combustion engine 10 can be operated in a discrete number of operating conditions, i.e. at a number of fixed points, memorized and selected by central control unit 21, to supply maximum power at low engine speed and with low consumption, even when user operation of accelerator pedal 32 demands maximum vehicle drive speed or torque. In other words, user operation of accelerator pedal 32 does not directly alter the speed of internal combustion engine 10.

For example, the power generated by internal combustion engine 10 flows into reversible electric machine 11 and straight along an electric bus to electric motor 18, and any excess starting power demand is delivered by battery pack 19.

The power delivery control system provides for optimizing the speed/power/consumption performance of internal combustion engine 10 at certain points in the characteristic curve of the engine, to achieve the necessary power output combined with low consumption.

In addition to operating as a generator when internal combustion engine 10 is on, reversible electric machine 11 can also operate as a motor by means of battery pack 19 to drive hydraulic pump 12 when engine 10 is off and clutch 14 released. In this operating mode, accelerator pedal 32 is the only control the user has to operate to move vehicle 1 back and forth by means of the lever referred to above.

In fully electric mode, battery pack 19 also powers electric fans 25 to cool reversible electric machine 11 and electric motor 18.

Electric motor 18 may even be a reversible electric machine and so recover energy when braking, even when vehicle 1 is in fully electric mode, e.g. with clutch 14 released and reversible electric machine 11 necessarily operating as a motor to drive hydraulic pump 12.

For vehicle 1 to operate properly in fully electric mode, the design, in terms of power, of battery pack 19, electric motor 18, pump 12, and reversible electric machine 11 is especially important, to enable vehicle 1 to operate fully electrically with internal combustion engine 10 off, and so electrically drive the vehicle and lifting systems simultaneously, to operate for a sufficient length of time, for example, in confined spaces with zero emissions.

Power drive 20 comprises an electric outlet for connection to an external electric power source by which to both recharge battery pack 19 and power electric motor 18. Moreover, because battery pack 19 has a voltage, for example, of 700V or more, provision is made, by means of a voltage converter, for a number of on-board 220V and/or 400V user device power outlets. The telescopic arm may thus be fitted with a platform equipped with a 12V and/or 24V and/or 220V and/or 400V outlet for powering work tools on the platform.

Vehicle 1 has the following advantages.

The vehicle according to the present invention is one of a category of telescopic-arm vehicles requiring, say, 60 kW power to drive the vehicle, and 40 kW to start pump 12 to raise telescopic arm 3. Bearing in mind the type of work and the average operating cycles of the vehicle, sufficient energy can be provided in fully electric mode to drive the vehicle and also power telescopic arm 3. Moreover, the hybrid-conversion component parts of the vehicle are housed in an innovative arrangement of three opposite compartments, which effectively groups the components on either side of the constant-velocity, double universal joint drive 31, and simplifies connection of electric motor 18 to drive 31. Electric motor 18 being compact and powered by electric cables smaller in bulk than a mechanical drive, the layout described is perfectly suited to most telescopic-arm lifting vehicles, with no alterations to the frame required.

Moreover, the centre of gravity of the vehicle is maintained low, by virtue of the heavier additional components, i.e. electric motor 18, reversible electric machine 11, and battery pack 19, being located at more or less the same height as the wheel axles.

Electric motor 18 and, therefore, vehicle 1 are driven solely by the user operating accelerating pedal 32, while reversible electric machine 11 charges battery pack 19 and/or drives hydraulic pump 12 by means of central control unit 21.

The electric power components (at least electric motor 18, reversible electric machine 11, battery pack 19, and the capacitors) and mechanical power components (at least pump 12 and internal combustion engine 10) are designed to permit simultaneous operation of telescopic arm 3 and electric motor 18, so vehicle 1 can be operated cleanly in closed environments in, for example, the agricultural and food industry, industrial or agricultural warehouses, or tunnels.

When the vehicle is run in hybrid mode with internal combustion engine 10 running or startable, central control unit 21 is programmed to control clutch 14 and turn internal combustion engine 10 on/off fully automatically at the end of the programmed operation, with no assistance from the user. The user controls the arm by means of a joystick connected to central control unit 21, and controls vehicle speed solely by means of accelerator pedal 32, i.e. simply and intuitively, with no other manual adjustments required. Central control unit 21 automatically turns internal combustion engine 10 on to charge battery pack 19 and/or drive pump 12 in lieu of reversible electric machine 11. The input signal from accelerator pedal 32, i.e. the power demanded of electric motor 18, is only one of many possible parameters processed by central control unit 21 to implement the on/off strategy of internal combustion engine 10.

Central control unit 21 controls internal combustion engine 10 to operate at a discrete number of fixed, high-energy-efficiency points, so as to minimize transient states and reduce consumption.

The series hybrid configuration requires an engine 10, hydraulic pump 12, and reversible electric machine 11 housable in a side compartment of the frame, between axles 27 and 28. More specifically, using the electric circuit, and an engine 10 and permanent-magnet, brushless electric motor 18, both, for example, 55 or 60 kW rated, it is possible to achieve the same performance as a vehicle equipped with an internal combustion engine of over, say, 75 kW and connected to a hydraulic motor-pump assembly for driving constant-velocity, double universal joint drive 31. More specifically, electric motor 18, especially if a permanent-magnet, brushless type, can operate in peak conditions, with torques of over 50% of maximum rated torque, for limited periods of time of even a few minutes. In the example described, the power of the reversible electric machine is at least 60 kW.

As regards the batteries, for any given power, lithium and lithium polymer batteries are compact and lightweight, and have been improved in efficiency and charging/discharging performance, so they can be installed on industrial vehicles in sizes suited to different applications, with no increase in total vehicle weight.

Clearly, changes may be made to vehicle 1 as described and illustrated herein without, however, departing from the scope defined in the accompanying Claims.

For example, a retrofit kit for existing lifting vehicles may be provided comprising a new, lower-power internal combustion engine 10, reversible electric machine 11, drive 13, electric motor 18, battery pack 19, power drive 20, central control unit 21, and the accelerator pedal potentiometer.

The arm/tool/cab assembly 3/4/5 may be made revolvable by disconnecting the bottom part of the frame with a pivot to rotate cab 5 and arm 3 with respect to the part of the frame housing the internal combustion engine, electric motor, and drive. The pivot may be driven as normally by a hydraulic system parallel to the circuit powered by pump 12, or by an additional electric motor.

The vehicle according to the present invention may be used to considerable advantage with internal combustion engines of various power ratings, e.g. 50 or 100 kW, typical of the most common telescopic-arm vehicle applications.

Batteries 19 may be either high-performance, i.e. lithium or lithium polymer types, or conventional lead or lead gel types.

The invention claimed is:

1. A lifting vehicle comprising front and rear axles with respective differentials; a constant-velocity, universal joint drive longitudinally connecting said front and rear differentials; a telescopic arm; and at least one hydraulic circuit powered by a hydraulic pump to operate said telescopic arm; the vehicle further comprising a first side compartment positioned between said axles housing an internal combustion engine, a reversible electric machine, said hydraulic pump, and a disconnectable drive for selectively disconnecting said internal combustion engine from said reversible electric machine and said hydraulic pump; said reversible electric machine driving said hydraulic pump when said internal combustion engine is disconnected from said disconnectable drive; and a battery housed in a second side compartment opposing said first side compartment with respect to said constant-velocity, universal joint drive, the battery being connected for charging said reversible electric machine and to an electric motor connected to said constant-velocity, universal joint drive to provide a series hybrid drive with the internal combustion engine.

2. The vehicle as claimed in claim 1, further comprising a pedal; and a central control unit configured to control said electric motor and, therefore, the speed of the vehicle solely on the basis of a signal from said pedal.

3. The vehicle as claimed in claim 2, wherein said central control unit is programmed to permit simultaneous operation of said electric motor and said hydraulic pump powered electrically by said reversible electric machine, when said internal combustion engine is off.

4. The vehicle as claimed in claim 3, wherein said central control is programmed to automatically turn on said internal combustion engine on the basis of one of a number of operating parameters including the charge of battery, the torque or power demand of said hydraulic pump, the power demand of cooling circuit fans or the power demanded by said electric motor.

5. The vehicle as claimed in claim 1, wherein the maximum power rating of said electric motor is greater than or equal to the maximum power of said hydraulic pump.

6. The vehicle as claimed in claim 1, wherein said electric motor is housed in a third compartment beneath said telescopic arm.

7. The vehicle as claimed in claim 1, wherein the electric motor is connected to the constant-velocity, universal joint drive by an at least two-ratio transmission.

8. The vehicle as claimed in claim 1, further comprising a voltage bus for powering said electric motor and said reversible electric machine; and a low-voltage 12V or 14V converter for at least said hydraulic pump.

9. The vehicle as claimed in claim 1, wherein said internal combustion engine is of a power ranging between 40 and 75 kW; and said electric motor has substantially the same power rating as said internal combustion engine.

10. The vehicle as claimed in claim 1, further comprising an electric outlet for connection to an external electric power source, by which to carry out the charging of said battery or the powering of said electric motor or said reversible electric machine.

11. The vehicle as claimed in claim 1, further comprising a DC/AC electric power converter powered by said battery; and at least one outlet connected to said electric power converter to power electric user devices with 220 Vac and/or 380 Vac.

12. The vehicle as claimed in claim 1, wherein said electric motor is a second reversible electric machine programmable to recover energy when braking, even when said disconnectable drive is disconnected and said reversible electric machine powers said hydraulic pump.

13. The vehicle as claimed in claim 1, further comprising a plurality of capacitors connected at least to said reversible electric machine and said electric motor, and which capacitors charge and discharge rapidly to regulate peak power demands.

14. The vehicle as claimed in claim 1, further comprising a first cooling circuit for cooling said internal combustion engine; a second cooling circuit, separate from said first cooling circuit, for cooling at least said reversible electric machine and said electric motor; an electric pump; and at least one electric fan for cooling a radiator of said second cooling circuit.

15. The vehicle as claimed in claim 6, wherein the first, second and third side compartments are positioned, relative to the front and rear axles, to maintain a low center of gravity for the vehicle.

\* \* \* \* \*